United States Patent [19]

Roy

[11] Patent Number: 5,348,755
[45] Date of Patent: Sep. 20, 1994

[54] EXTENSION OF EDIBLE OIL LIFETIME USING ACTIVATED CARBONS

[75] Inventor: Glenn M. Roy, Oakdale, Pa.

[73] Assignee: Calgon Carbon Corporation, Pittsburgh, Pa.

[21] Appl. No.: 847,781

[22] Filed: Mar. 4, 1992

[51] Int. Cl.$^5$ ............................................... A23D 9/06
[52] U.S. Cl. ................................... 426/541; 426/423; 210/504; 210/506; 252/397; 502/417
[58] Field of Search ................ 502/401, 416, 417; 252/397; 426/541, 542, 543, 422, 424, 330.6, 438, 423; 210/502.1, 504, 506

[56] References Cited

U.S. PATENT DOCUMENTS

| | | | |
|---|---|---|---|
| 1,519,470 | 12/1924 | Wilson | 502/417 |
| 3,429,103 | 2/1969 | Taylor | 502/417 |
| 3,778,387 | 12/1973 | Urbonic et al. | 502/401 |
| 3,876,451 | 4/1975 | Zall | 502/417 |
| 4,676,907 | 6/1987 | Harrison | 210/502.1 |
| 4,696,742 | 9/1987 | Shimazaki | 210/502.1 |
| 4,789,475 | 12/1988 | Harte et al. | 210/688 |
| 4,959,144 | 9/1990 | Bernard | 210/502.1 |
| 4,988,440 | 1/1991 | Bernard | 210/504 |
| 5,068,115 | 11/1991 | Liebermann | 426/330.6 |
| 5,112,482 | 5/1992 | Shaub | 210/502.1 |

FOREIGN PATENT DOCUMENTS 3013256 10/1981 Fed. Rep. of Germany ...... 502/407

*Primary Examiner*—Carolyn Paden
*Attorney, Agent, or Firm*—Cindrich & Titus

[57] ABSTRACT

A method and adsorbent for increasing the life of edible oils are disclosed. The present method comprises substantially continuous treatment of edible oil with activated carbon during processes carried out at elevated temperature. The treatment may be by filtration through a filter means containing activated carbon or by immersion within the oil of an oil porous enclosure containing activated carbon. An adsorbent for substantially continuous use at elevated temperature is also disclosed. The adsorbent includes antioxidant impregnated activated carbons.

23 Claims, 7 Drawing Sheets

EXTENSION OF EDIBLE OIL LIFETIME USING ACTIVATED CARBONS

FIELD OF THE INVENTION

The present invention relates to the extension of edible oil lifetime during heating operations and especially to activated carbons and a substantially continuous contact method for effecting such an extension of edible oil lifetime.

BACKGROUND OF THE INVENTION

Deep frying oils and shortenings include those edible oils derived from corn, soybeans, palm, tallow and other vegetable and animal sources. Because of concerns over the harmful effects of cholesterol, however, nearly all fast food restaurants and food processors have converted to 100% vegetable oil for deep frying.

Unfortunately, vegetable oil (as a result of its unsaturated lipid structure) decomposes more readily than tallow when exposed to air and moisture at frying temperatures. Repeated food frying cycles subject vegetable oil to temperature swings and aeration which quickly lead to a runaway decomposition profile, resulting in a severely limited frying lifetime.

"Spent" frying oil is generally discarded when an unacceptable deterioration in food quality is experienced. Currently, disposal of "spent" vegetable oil is conducted approximately weekly. Institutions which claim no oil is discarded or recycled because most of he oil is lost to food absorption are faced with a mew challenge. Diet consciousness has created a market for coatings for fried foods to reduce oil absorption into the food product. The end result is less absorptive oil-loss and less necessary oil replenishment or "top-up," thereby increasing the overall content of decomposition products quicker than would be experienced with normal top-up.

Recent economic and regulatory changes in the frying industry dictate more prudent use of deep frying oil than currently practiced. Colorimetric tests such as Oxifrit® and Fritest® available from E. Merck of Darmstadt, Germany, make the polymeric content of frying oils easily measurable at both frying and room temperature. An additional test, VERI-FRY TPM Quick Test® available from Libra Laboratories of Piscataway, Ne Jersey, measures polar content with greater facility than either Oxifrit or Fritest. Upon the basis of polar (polymer, fatty acids and other oxidized products) content, governmental regulations may soon require more frequent disposal of used oil.

Indeed, several European Economic Community member states have recently adopted regulations setting forth maximum allowable polar content of frying oils. The maximum polar content established by these regulations, ranging between 16 and 27 percent, can be reached in two to three days of restaurant use. More frequent disposal brought about by government regulation will result in considerable financial loss to processors and/or users of frying oils.

Frying oil decomposition products generally arise in three ways: 1) hydrolysis; 2) solubilization; and 3) oxidation. Numerous systems have been developed to remove various decomposition products resulting from hydrolysis and solubilization. The minor polar contaminants arising from hydrolysis, namely fatty acids and fatty alcohols, are claimed to be efficiently removed by the technologies of silica and alumina adsorbency.

Undesirable color changes arising from solubilization as well as dissolved odors are claimed to be removed efficiently by periodic filtration and powdered activated carbon ("PAC"). U.S. Pat. Nos. 4,988,440 and 4,959,144 for example, disclose filter pads containing 15–40% silicates with 15–35% "Darco S-51," a PAC available from American Norit Company, Inc., of Jacksonville, Florida, or "Cecarbon PAC 200," available from Atochem of Pryor, Oklahoma, for use in frying preparations. Periodic filtration is also disclosed in U.S. Pat. No. 4,363,823.

Periodic filtration systems of various types are used to remove contaminants and decomposition products from used frying oil. U.S. Pat. No. 4,974,501, for example, discloses a deep fat frying apparatus in which the oil is periodically drained from a selected fry pot and filtered to remove particulate matter.

U.K. Patent No. 2 146 547 A discloses a cleaning container for edible oils removed from cooking vats. An activated carbon filter element is disclosed which operates to remove from edible oils gases and liquids which may cause smells.

JP 01,123,612 discloses a filter of pulp, PAC and clay molded and dried for periodic filtration of used cooking oil to remove offensive odors of fish.

JP 03,193,101, JP 03,193,102 and JP 03,193,103 disclose periodic filtration of spent edible oil from frying foods using a container made of fibrous material and having granular activated carbon packed therein.

JP 60,135,483 discloses a precoat technology of PAC and Celite® to clense oil.

Additional systems have been developed for continuously removing contaminants from edible oil. U.S. Pat. Nos. 4,957,758 and 4,962,698 disclose a method and apparatus for refining cooking oils in which the oil is continuously fed through a filter system immediately after starting the frying process and within the time free fatty acids or fatty acid oxidation products are formed. Filters of acrylic fibers are disclosed to remove food particulate matter (cracklings).

U.S. Pat. No. 5,008,122 discloses a process and apparatus for continuously removing contaminants from edible cooking oil by solvent extraction. A continuous stream of cooking oil at an elevated temperature is withdrawn from the cooking bath. A continuous stream of liquid solvent for at least a portion of the contaminants within the oil is then mixed with the oil. The oil is subsequently separated and returned to the cooking bath.

U.S. Pat. Nos. 4,487,691 and 4,668,390 disclose deep fat fryers with continuous filtration of frying oil through a helical- or serpentine-shaped, finned-tube heat exchanger followed by a filter comprising a carbon impregnated cloth. The filter housing is positioned to permit ready replacement without fat loss or tank draining.

U.S. Pat. No. 4,623,544 discloses an apparatus for deep fryers including a bypass-type oil filtering structure. The filtering structure, changed daily, removes food particulate matter (cracklings) in a fryer with a 90% efficient heat exchanger.

U.S. Pat. No. 4,704,290 discloses a recirculating-type deep fryer including filtration by means of an in-tank crumb tray to remove food particulate matter.

U.S. Pat. No. 3,977,973 discloses an integral, continuous filter to remove particulate matter with a removable frame.

At present, few if any commercially effective systems exist for reducing polymeric material content resulting from oxidafire decomposition. Oxidative decomposition results predominantly from the formation of hydroperoxides. Peroxide value ("PV") or buildup of peroxide content is directly proportional to the formation of quality-depleting carbonyl content or polymeric materials. Peroxide presence prior to decomposition is dependent on the temperature of the frying medium. At temperatures of 65° C. and below, for example, formation is easily measurable and decomposition is very slow. Above 65° C. to 110° C., rate of formation is nearly equal to rate of decomposition. Above 110° C., the peroxides decompose rapidly to a myriad of products whose selective adsorption would be difficult to control.

It is believed that control of peroxide value in edible oils may also control polymer formation. This control may be effected by antioxidants and chelation agents which interrupt the process of oxidation in oils.

U.S. Pat. No. 4,968,518 discloses a process for the treatment of frying or cooking oil comprising contacting at least a portion of used cooking oil with an aqueous solution containing one or more antioxidants. The antioxidants are selected from the group consisting of ethylenediaminetetraacetic acid ("EDTA"), n-propyl-3,4,5-trihydroxybenzoate ("propyl gallate") and mono-tertbutylhydroquinone ("TBHQ"). The cooking oil is first withdrawn from the cooker and cooled to a temperature below the boiling point of the aqueous solution by indirect heat transfer. The cooled cooking oil is then passed through the aqueous solution of antioxidants in an extraction vessel. After extraction, the oil is phase separated. The recycled oil may optionally be passed through an absorption zone including a suitable adsorbent, such as activated carbon to remove soluble oxidized and pyrolyzed contaminants from the oil.

Antioxidants, in general, have been developed primarily to lengthen shelf life of edible oils and have poor stability at high temperatures. Moreover, antioxidants are lost by steam distillation out of the oil or by absorption into the frying food.

U.S. Pat. No. 5,068,115 discloses a method for cleaning edible oils using an immersible packet containing the ground rind from a fruit, such as granulated grapefruit peelings. An antioxidant is provided by and carried with the ground rind of the fruit (the rind contains citric acid and ascobic acids which are known antioxidants). The method comprises immersion of a porous or perforated packet containing citrus peels into the edible oil. The porous packet is retained in the edible oil for at least five minutes during which time the edible oil can flow through the porous packet and contact the citrus peelings within the packet. At the end of the appropriate period of time, the porous packet is removed from the edible oil. It is also disclosed to prefilter the oil through a cellulosic filter impregnated with ground spices such as peppercorns or cloves.

A study on the effects of low-temperature, periodic filtration through several activated carbons on peroxide value, thiobarbituric acid and carbonyl values of autoxodized soybean oil is discussed by Boki, et al., J. Amer. Oil Chem. Soc. 68(8), 561–565 (1991). Substantial peroxide reduction at 60° C. was found using 23 selected powdered activated carbons and granular activated carbons for edible oil storage studies. The results of the storage studies indicated that the quality of soybean oil treated with activated carbon was slightly better than that of an untreated control up to approximately 75 days, at which point oxidation was found to occur more rapidly in the treated oil. Decrease in the oxidative stability of the treated oil overtime was thought to result from removal of $\alpha$, $\beta$ and $\gamma$-tocopherols.

The usefulness of activated carbons in filtration processes is limited according to at least one commentator because of the removal of the antioxidant tocopherol. Jacobson, G. A., Quality Control in Deep-Fat Frying Operations," Food Technology, 72 (February 1991).

U.S. Pat. No. 4,125,482 discloses an MgO impregnated activated carbon for use in the refining of edible vegetable oil. A previously degummed vegetable oil is passed through a bed of granular activated carbon impregnated from about 1.0% to about 15.0% by weight of MgO. The treatment is claimed to reduce the content of free fatty acids, phospholipids, peroxides and other impurities to improve the stability of the oil over its shelf life.

JP 58,020,152 discloses an antioxidant material comprised of zeolite, AC, alumina, activated white clay, silica or ion exchange resin to adsorb oxidation decomposed products and slow the oxidation. The method of treatment is by addition of the antioxidant material to the oil or by periodic filtration of the oil through the material.

McNeill, et al., J. Amer. Oil Chem. Soc. 63 (12), 1564–1567 (1986) discuss improvement of the quality of used frying oils by treatments with a combination of activated carbon and silica. Three levels of activated carbon (3%, 6% and 9% wt/wt) were blended with three levels of a silica compound (2%, 4% and 6% wt/wt) in all nine possible combinations in the study at 60° C. For each treatment combination of silica and carbon, the average percent decrease for acid value, peroxide value, photometric color, polar compounds, saturated carbonyls and unsaturated carbonyls was studied. It was postulated that some type of flow-through cartridge system might be more efficient than the batch filtering system studied and might allow a greater throughput while minimizing oil losses.

Activated carbon, silica, Celite (diatomaceous earth) and alumina (a synergistic treatment) filtration systems thus have a presence in edible oil filtering process but an improved filtration process would be welcomed by the user.

A process which offers improved reduction of total polar content would be a seminal contribution to the frying industry.

SUMMARY OF THE INVENTION

The present invention generally comprises a method for extending the life of an edible oil during a process at a temperature of at least 120° C. (e.g., elevated temperature processes such as frying) comprising contacting the oil substantially continuously with an activated carbon during the process. The present method is suitable when edible oil is used alone in the process or when edible oil is used in conjunction with one or more cooking oil substitutes such as Olestra ® available from Procter & Gamble, Co. of Cincinnati, Ohio. Activated carbons suitable for use in the present invention are preferably either selected high activity carbons or novel food grade antioxidant impregnated carbons.

Preferably the oil is contacted with the activated carbon by passing the oil through a filter means containing the activated carbon. The filter means may be external to the apparatus in which the process occurs. The oil is preferably pumped through a filter means containing a granular, pelletized or bonded activated carbon. Powdered activated carbons require a relatively large pressure gradient in such substantially continuous filtration processes. Most preferably the oil is passed through a replacable cartridge of granular activated carbon ("GAC").

The activated carbon may also be contacted with the oil under the present invention by immersing an oil porous enclosure containing the activated carbon within the oil during the process. In this case, the activated carbon is preferably a powdered activated carbon.

The present invention also comprises novel food grade antioxidant impregnated carbons. The antioxidant impregnated carbons of the present invention provide a protected antioxidant environment and/or time-released antioxidant concentration as needed to protect frying oil. An antioxidant impregnated carbon may alleviate the current deficiencies of antioxidants by preventing them from steam distilling out or being used up through food absorption. This immobilized form of strongly physisorbed food grade antioxidants should relieve the user of adding more antioxidant such as Tenox®, a food grade antioxidant available from Eastman Kodak Co. of Rochester, New York.

Antioxidant impregnated carbons of the present invention can be formed using an incipient wetness impregnation technique. The present invention also permits an in situ preparation of an antioxidant impregnated carbon wherein an operator, utilizing a high activity carbon, pours a chosen antioxidant into the frying oil. Through continuous circulation of the oil through the activated carbon, the antioxidant physisorbs onto the activated carbon in situ to effect reduced polymer formation.

Advantages other than intrinsic decolorizing and deodorizing properties are observed in carbon treated heating studies under the present invention versus control studies of oil both with and without frying food. The activated carbons of the present invention were observed to reduce polymer formation, maintain lower viscosity and double to quintuple lifetime of stressed oil under raw potato frying conditions. Cartridges of AC (granular) were not changed in nine frying days or longer in food frying studies. The extended use enabled by the present invention provides reduced cost and reduced safety concerns over presently used powdered activated carbons and other adsorbents which generally require daily change. The use of granular, pelletized and bonded carbons enables higher flow processing than in conventional powdered activated carbon applications. The elimination of the need to cool the oil below 120° C. associated with some prior art systems reduces operating cost and system complexity.

DETAILED DESCRIPTION OF THE INVENTION

High Performance Size Exclusion Chromatography (HPSEC) of daily fryer samples supplied by a local fast food restaurant showed significant formation of polymers after only one day of oil use. The method of HPSEC used in the present analyses is described in detail by White, P. J., et al., J. Amer. Oil Chem. Soc. 63(7), 914 (1986), the disclosure of which is incorporated herein by reference.

Figure 1:
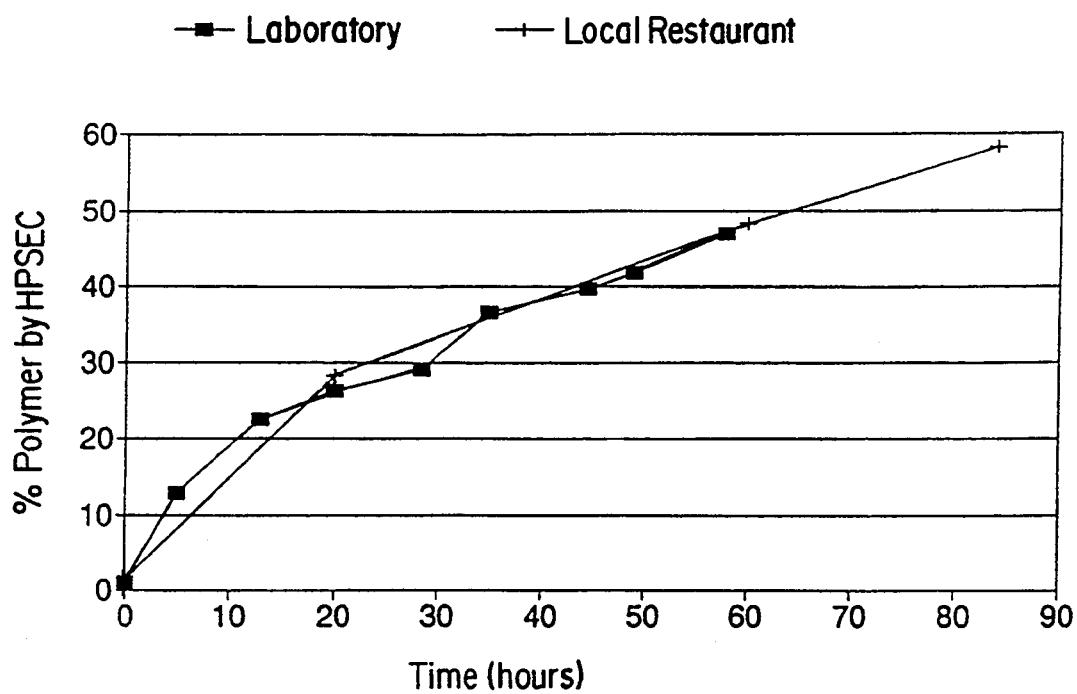
FIG. 1 is a graphical representation of an HPSEC study of restaurant and laboratory food frying oil.

Laboratory HPSEC analysis of stressed frying oil supplied by the local fast food restaurant demonstrated maximum polymer levels established by several European Economic Community member states were obtained in 2-3 day's use. These results are shown in FIG. 1. After 7 days of use, less than 50% pure corn oil triglyceride content was evident.

As also illustrated in FIG. 1, HPSEC analysis demonstrated a time-use profile of a designed laboratory non-pumping, non-treated frying operation (FryDaddy's®, commercially available from Presto) was nearly identical in scale and effect to the restaurant's non-pumping, non-treated frying corn oil. This study demonstrated that polymer formation experienced with the designed laboratory apparatus and frying condition is indicative of that experienced under restaurant frying conditions. Improvements in polymer formation experienced in the laboratory studies are therefore transferable to commercial restaurant fryers.

Adsorption isotherms of numerous granular and powdered activated carbons, kaolin (an aluminum silicate), aluminas and purified silicas were conducted at 90° C. and 5% (wt/wt %) with stressed oil. Polymer quantification showed no diatomaceous earth, silica, alumina, clay or carbon adsorbent is significantly selective for removal of polymers once formed in the corn oil. Because selective removal of polymeric content from stressed oil is extremely difficult, control of polymer formation during elevated temperature use is desirable.

Figure 2:
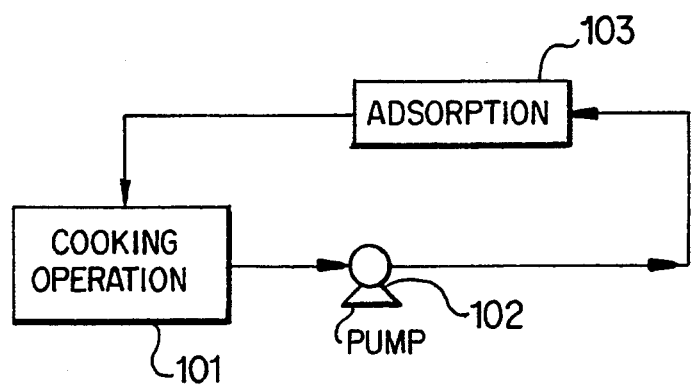
FIG. 2 is an illustration of an embodiment of a frying operation employing an adsorption zone of GAC, carbon pellets or bonded carbon.
Figure 3A:
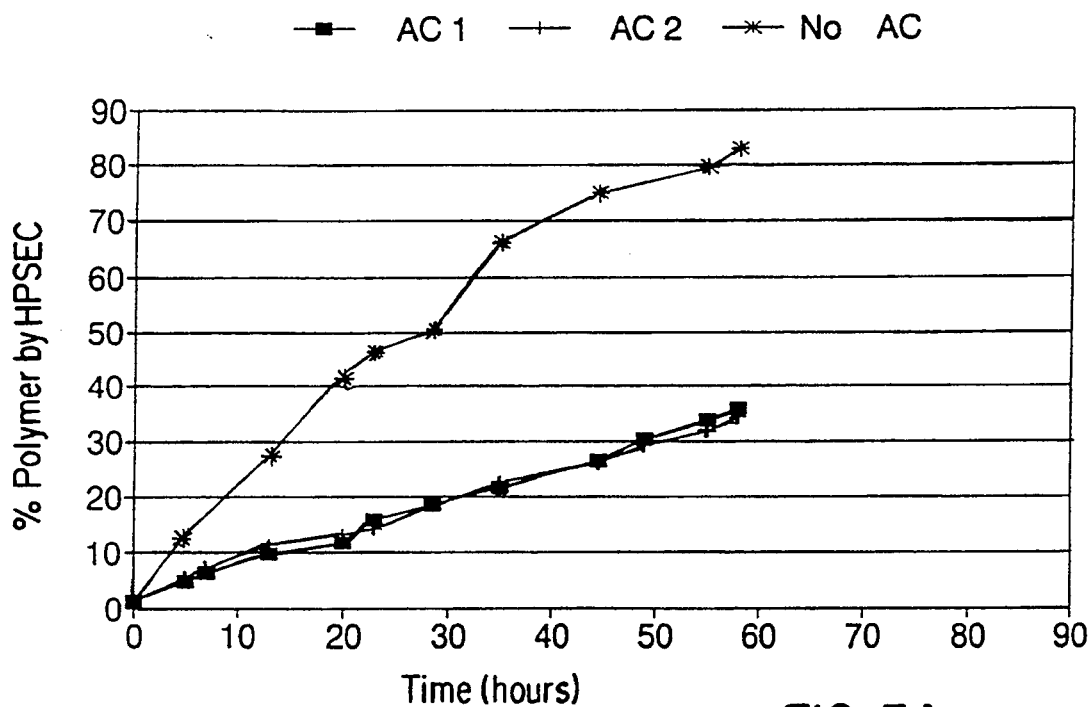
FIGS. 3A, 3B and 3C are graphical representations of an HPSEC evaluation of several AC's without frying food.
Figure 3B:
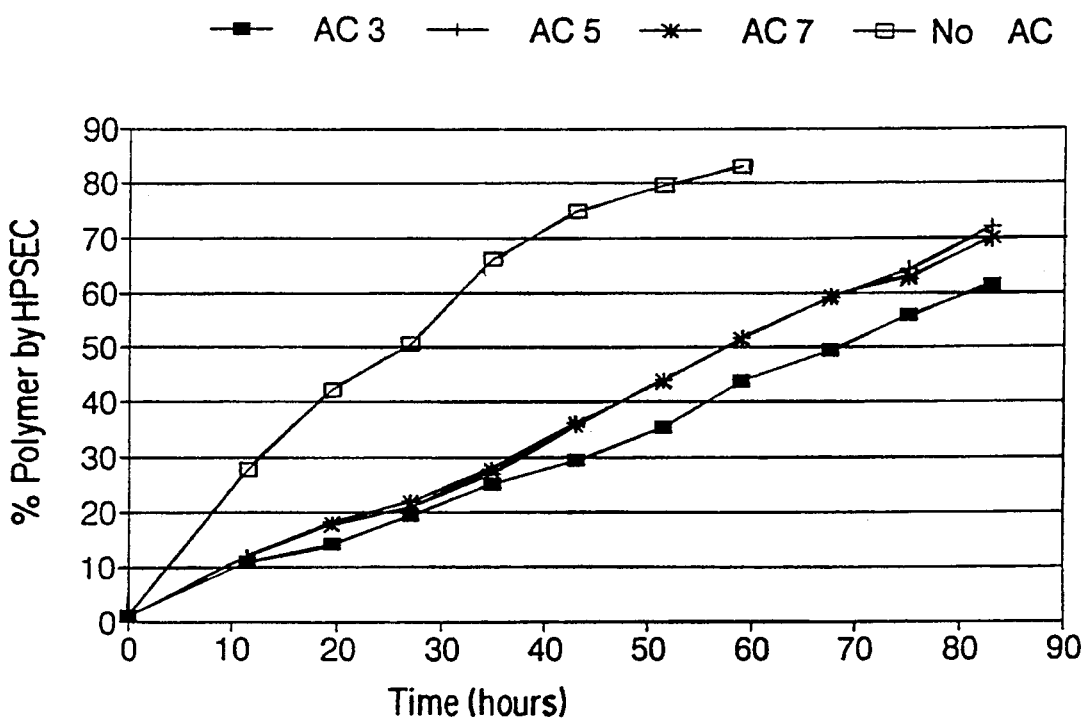
Figure 3C:
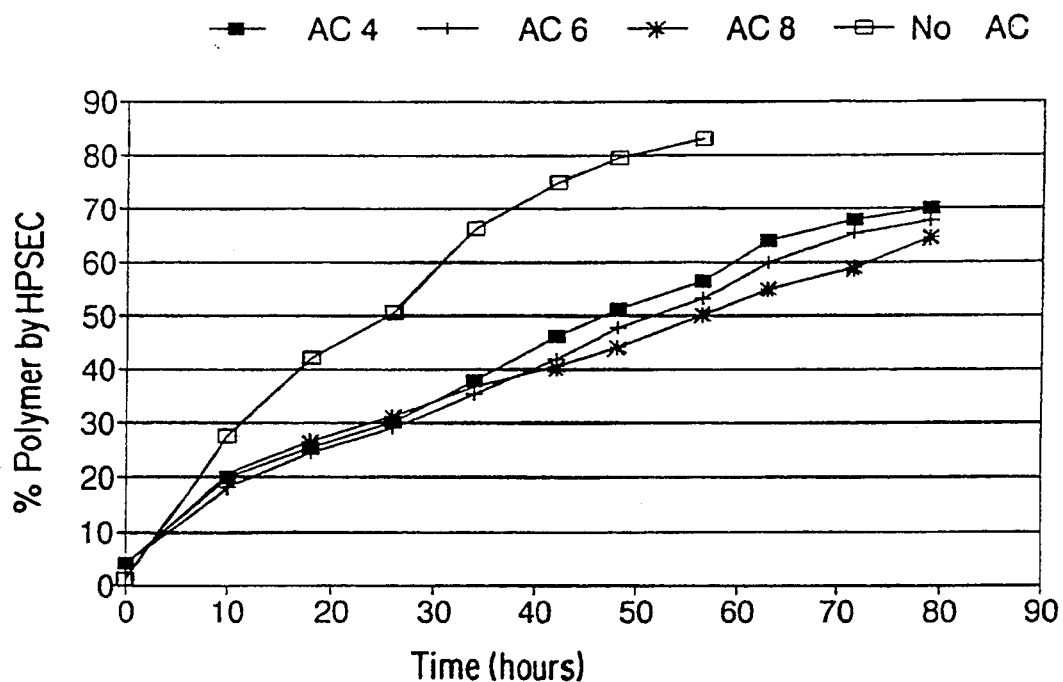

Polymer Reduction in Frying Oils With Activated Carbons And Antioxidant Impregnated Activated Carbons An apparatus 100 as illustrated in FIG. 2, permitted the evaluation of the polymer reduction properties of several granular activated carbons in a continuous filtration process. The frying oil was heated in a heating or cooking operation 101 at temperatures in the range of 200°–205° C. without food frying. Pump 102 enabled continuous filtration of the frying oil through adsorption zone 103. Adsorption zone 103 comprised a pyrex, thick-walled glass column containing an activated carbon. After passing through the activated carbon of adsorption zone 103, the filtered oil was returned to cooking operation 101. FIGS. 3A, 3B and 3C illustrates the results of studies with corn oil in the absence of food frying.

The granular activated carbons AC1 through AC8 are identified as follows:
AC1—5 wt/wt % Propyl Gallate impregnated CPG;
AC2—APA;
AC3—CPG;
AC4—PCB;
AC5—CaneCAL;
AC6—F200 or Filtrasorb ® 200;
AC7—OL; and
AC8—SGL.

Each of APA, CPG, PCB, CaneCal, F200, OL and SGL activated carbons are available from Calgon Carbon Corporation of Pittsburgh, Pennsylvania.

The nearly linear behavior of polymer formation as a function of increasing time permitted linear regression analysis of the data for several carbons of FIGS. 3A, 3B and 3C. Table 1 provides the results of this linear regression analysis. As seen, the $R^2$ correlation coefficients were nearly unity in all cases, indicating a good linear fit of the data.

Using the linear equation $y = mx + b$, wherein y is polymer content; x is time in hours; b is the y-intercept, the slope m for each studied activated carbon was determined as provided in Table 1. Lower slope value indicates better effectiveness in polymer reduction per unit time.

TABLE 1

CONTINUOUS FILTERING TREATMENT
LINEAR REGRESSION ANALYSIS

| CARBON | SLOPE* | CORRELATION |
|---|---|---|
| Control (no AC) | 1.96 | 0.996 |
| AC1 | 0.54 | 0.992 |
| AC2 | 0.58 | 0.996 |
| AC3 | 0.72 | 0.995 |
| AC4 | 0.73 | 0.965 |
| AC5 | 0.83 | 0.996 |
| AC6 | 0.83 | 0.991 |
| AC7 | 0.86 | 0.995 |
| AC8 | 0.89 | 0.989 |

*% polymer/time.

Based upon superior polymer reduction, several activated carbons were chosen for study in food frying experiments. In these experiments raw potatoes cut as french fries were used. Commercially available, pre-fried french fries were not used to ensure HPSEC analyses were uncontaminated by polymers and oil already present in such commercially available potatoes. Such contamination would occur by lipid exchange during the frying process. Frying conditions were chosen to closely mimic polymer formation in a restaurant setting.

Figure 4:
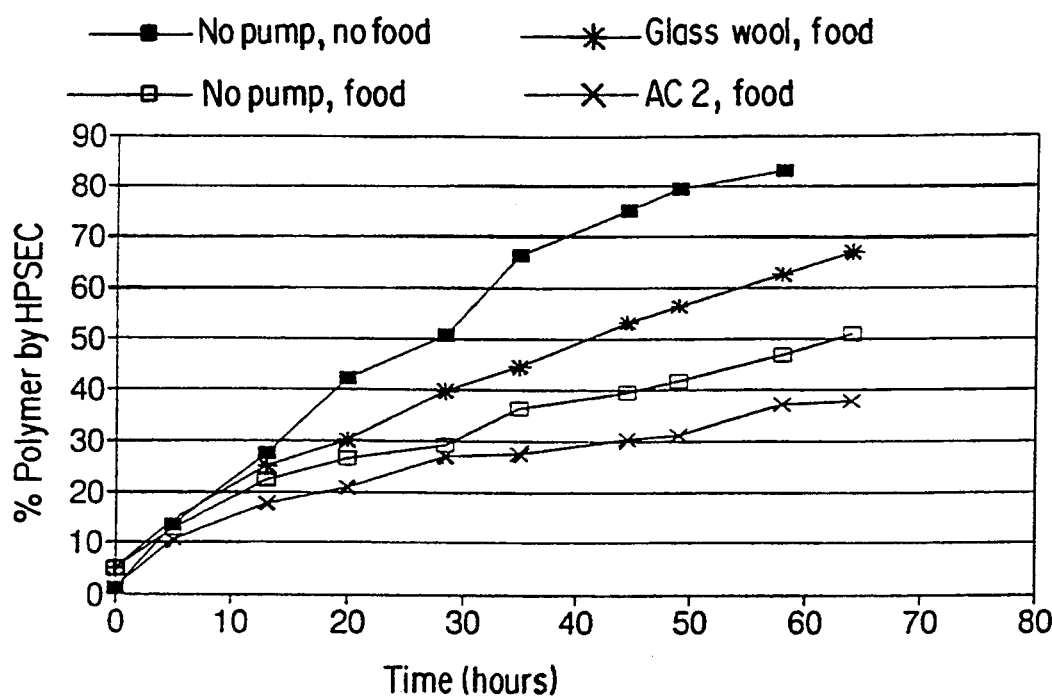
FIG. 4 is a graphical representation of an HPSEC study of heat stressed corn oil treatment effects.
Figure 5:
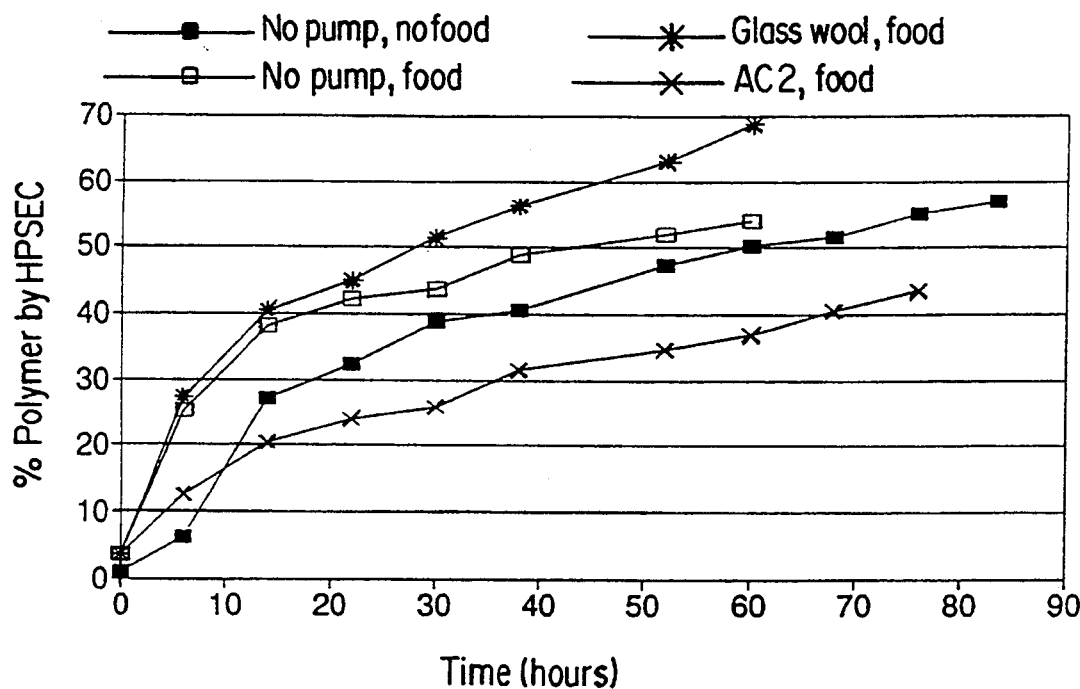
FIG. 5 is a graphical representation of an HPSEC study of heat stressed soybean oil treatment effects.

Continuous filtration studies were performed with raw potato frying in each corn oil and soybean oil. FIGS. 4 and 5 show the desirable results achieved with AC2 as compared to controls in which the oil was stressed both with and without frying food and without filtration and a control in which the oil was filtered through ultrapure glass wool during food frying. The following examples with AC1 and AC2 are representative of the method used.

EXAMPLE 1

Figure 6:
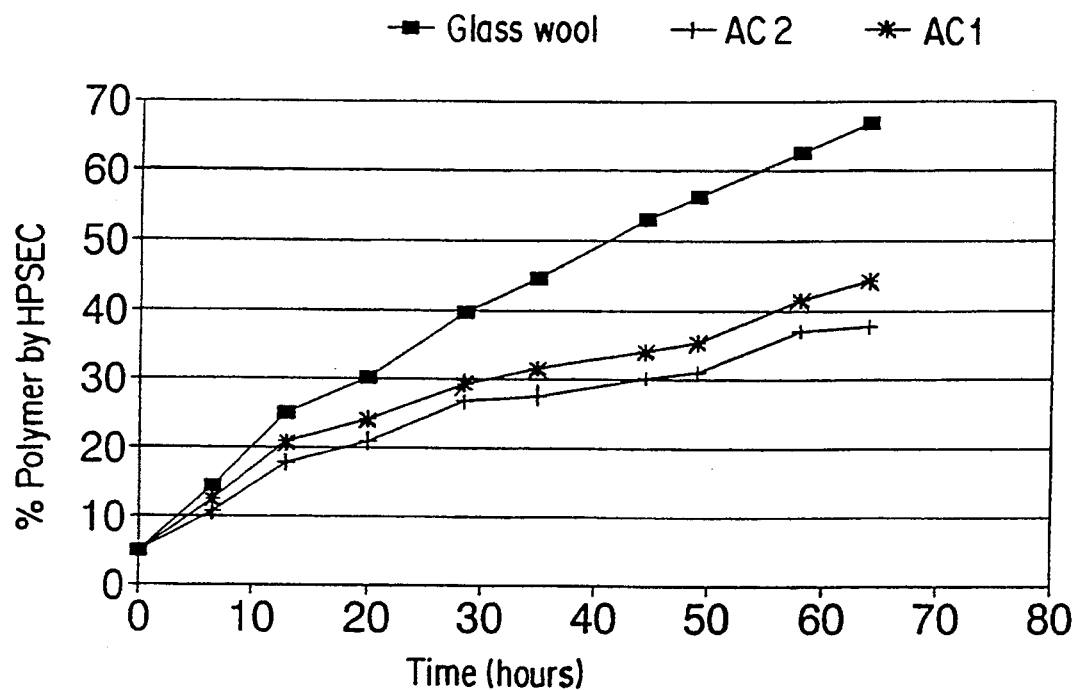
FIG. 6 is a graphical representation of an HPSEC study of corn oil-raw potato frying AC performance.

A novel composition for continuous filtration of frying oils includes a food grade antioxidant impregnated upon carbon. Corn oil was pumped at approximately one cup/min. (20–25% of the total volume) from a four-cup Frydaddy ® fryer through a 2% wt/wt of AC1 (a 5% wt/wt propyl gallate impregnated CPG) in a pyrex glass column (1"×6"). Raw potato frying (at an average of slightly less than one pound per fryer day) was conducted for nine (9) days at temperatures in the range of 190°–200° C. A fryer day consisted of an eight-hour day. An eight-hour fryer day in the Frydaddy frying of the present studies is equivalent to twelve-hours of restaurant frying because of surface area differences. The results of this study are tabulated in Table 2 and illustrated graphically in FIG. 6. In this study the oil was exposed to <1000 ppm propyl gallate during continuous treatment. Ultrapure (metal free) glass wool was used to filter particulates.

EXAMPLE 2

Figure 7:
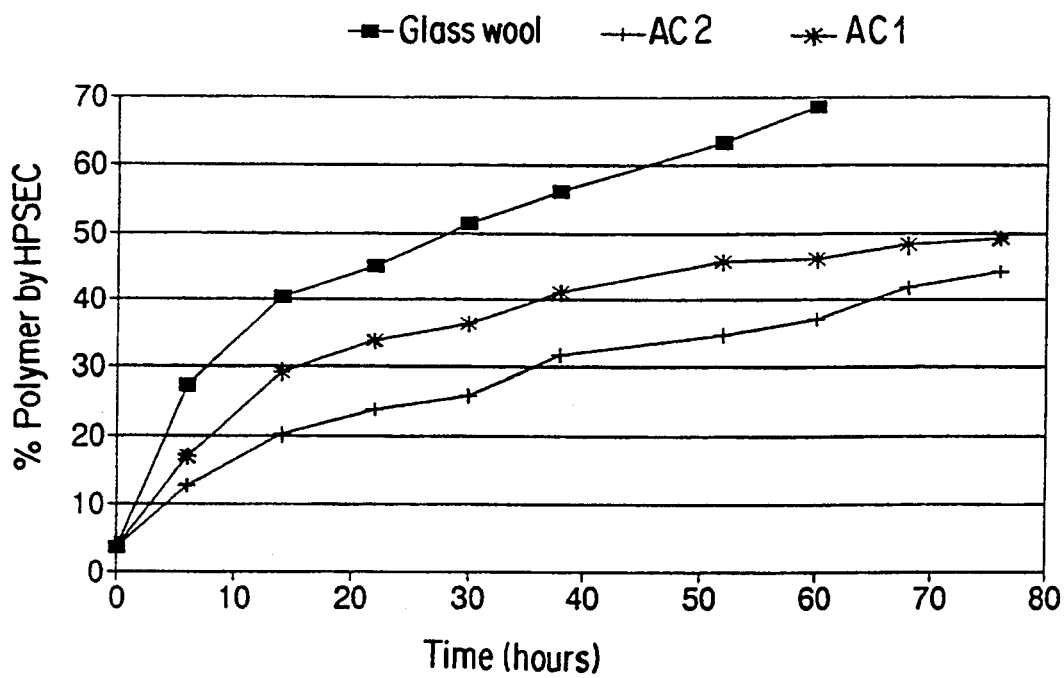
FIG. 7 is a graphical representation of an HPSEC study of soybean oil-raw potato frying AC performance.

Under conditions substantially identical to those described in Example 1, a study of AC1 was made with soybean oil. The results of this study are tabulated in Table 3 and illustrated graphically in FIG. 7. Once again it was found that polymer formation was substantially reduced by continuous filtration through the antioxidant impregnated carbon.

EXAMPLE 3

AC2 (granular APA available from Calgon Carbon Corporation) demonstrated superior performance to numerous other granular carbons. In this example, corn oil was pumped at approximately one cup/min. from a Frydaddy fryer holding four cups of corn oil through 2% wt/wt AC2 in a pyrex glass column. Raw potato frying (at an average of slightly less than one pound per fryer/day) was conducted for nine (9) days at a temperature in the range of 190°–200° C. The frying conditions were thus substantially the same as the study of AC1 in Example 1. The results of this study are tabulated on Table 2 and illustrated graphically in FIGS. 4 and 6.

EXAMPLE 4

Under conditions substantially identical to those described in Example 3, a study of AC2 was made with raw potato frying in soybean oil. The results of this study are tabulated in Table 3 and illustrated graphically in FIGS. 5 and 7.

TABLE 2

CORN OIL
RAW POTATO FRYING

| Time (h) | AC1 | AC2 | Glass Wool | No Pump | Amt. Fried |
|---|---|---|---|---|---|
| 0 | 4.9 | 4.9 | 4.9 | 4.9 | — |
| 6.5 | 12.5 | 10.6 | 14.4 | 12.8 | 100 |
| 13 | 20.9 | 17.9 | 25.1 | 22.5 | 100 |
| 20 | 24.2 | 20.9 | 30.2 | 26.4 | 215 |
| 28.5 | 25.9 | 26.9 | 39.8 | 29.1 | 430 |
| 35 | 31.7 | 27.5 | 44.6 | 36.5 | 485 |
| 44.5 | 34.2 | 30.3 | 53 | 39.6 | 530 |
| 49 | 35.5 | 31.1 | 56.3 | 41.7 | 475 |
| 58 | 41.5 | 37.1 | 62.6 | 46.9 | 455 |
| 64 | 44.3 | 37.8 | 66.8 | 50.9 | 355 |
| 71 | 51.6 | 45.1 | — | — | |
| 79 | 61.3 | 54.5 | — | — | |

TABLE 2-continued

| | CORN OIL RAW POTATO FRYING | | | | |
|---|---|---|---|---|---|
| Time (h) | AC1 | AC2 | Glass Wool | No Pump | Amt. Fried |
| | | | | | 3145 g |

(—) = no data recorded.

TABLE 2A

| | CORN OIL RAW POTATO FRYING | | | |
|---|---|---|---|---|
| | AC1 | AC2 | Glass Wool | No Pump |
| m | 0.552 | 0.539 | 0.963 | 0.673 |
| b | 10.33 | 7.694 | 9.695 | 10.014 |
| $R^2$ | 0.947 | 0.914 | 0.983 | 0.958 |
| x @ y = 25% | 26.5 | 32.6 | 15.9 | 22.2 |

TABLE 3

| | SOYBEAN OIL RAW POTATO FRYING | | | | | | |
|---|---|---|---|---|---|---|---|
| Time (h) | AC1 | AC2 | Alumina | Silica | Glass Wool | No Pump | Amt. Fried |
| 0 | 3.6 | 3.6 | 3.6 | 3.6 | 3.6 | 3.6 | — |
| 6 | 17.2 | 12.7 | 25.6 | 22.6 | 27.3 | 25.4 | 100 |
| 14 | 29.1 | 20.4 | 43.6 | 39.4 | 40.3 | 38.1 | 100 |
| 22 | 33.9 | 23.9 | 48.4 | 44.8 | 45.0 | 42.3 | 215 |
| 30 | 36.4 | 25.9 | 49.5 | 47.0 | 51.4 | 43.8 | 430 |
| 38 | 41.1 | 31.7 | 52.6 | 48.3 | 56.1 | 48.8 | 485 |
| 52 | 45.7 | 34.7 | 59.2 | 57.3 | 63.2 | 51.8 | 530 |
| 60 | 46.1 | 37.0 | 60.9 | 60.4 | 68.7 | 53.9 | 475 |
| 68 | 48.3 | 41.8 | 62.1 | 62.4 | — | — | 455 |
| 76 | 49.3 | 48.5 | — | — | — | — | 355 |
| | | | | | | | 3145 g |

(—) = no data recorded.

TABLE 3A

| | SOYBEAN OIL RAW POTATO FRYING | | | | |
|---|---|---|---|---|---|
| | AC1 | AC2 | Alumina | Silica | Glass Wool |
| m | 0.633 | 0.507 | 0.785 | 0.795 | 0.915 |
| b | 14.06 | 9.67 | 21.13 | 18.35 | 19.04 |
| $R^2$ | 0.842 | 0.912 | 0.759 | 0.815 | 0.864 |
| x @ y = 25% | 17.3 | 30.2 | 4.9 | 7.2 | 6.5 |

In addition to significant decolorizing and deodorizing, the carbons acted to substantially reduce polymer formation. Also, oil viscosity was maintained lower. The lifetime of the stressed oil under raw potato frying conditions was approximately doubled to quintupled. A single cartridge of the granular activated carbon was used in a nine fryer day period of operation.

Figure 8:
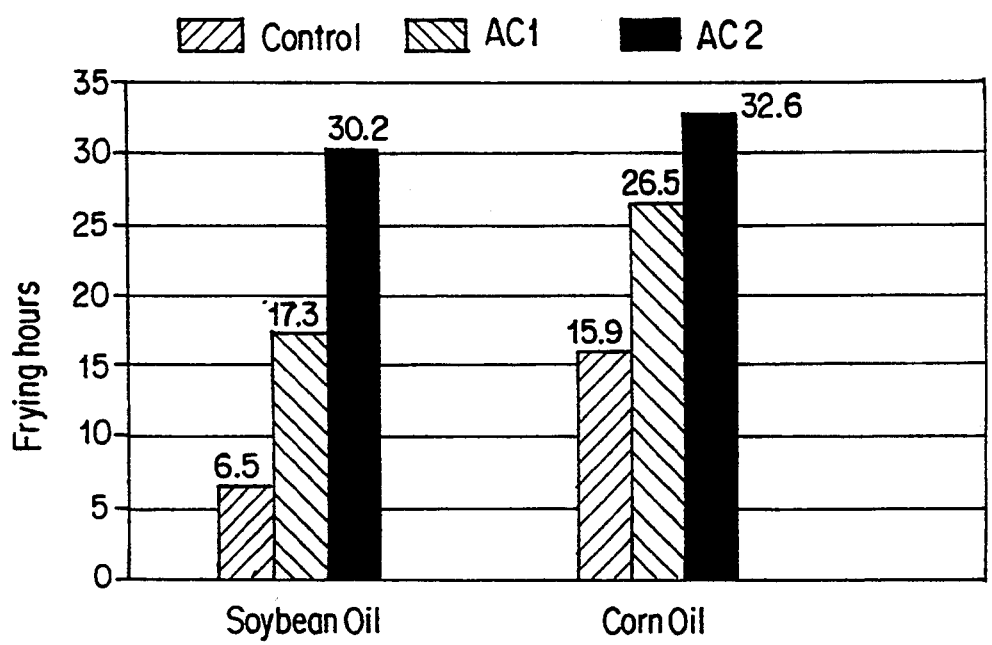
FIG. 8 is an illustration of frying oil lifetime extension using the present invention.

Using the equation y=mx+b, the amount of time required to reach a 25% polymer level (i.e., the maximum polymer level established by some EC member states) was calculated for the control (no AC), AC1 and AC2 in both corn oil and soybean oil as graphically illustrated in FIG. 8. The results are also tabulated in Table 2A and Table 3A. Continuous filtration of frying oil through activated carbon is seen to substantially increase the lifetime of the frying oil as such lifetime is dictated by recent regulations.

Incipient Wetness Impregnation Method for Organic Soluble or Aqueous Soluble Antioxidants The propyl gallate impregnated activated carbon of Example 1 (AC1) was prepared by the incipient wetness impregnation method. In this method, the solubility of the desired food grade quality antioxidant is first determined in non-toxic food grade solvents (e.g. hexane, ethanol and water).

The incipient wetness of the chosen form of activated carbon (pellet, granular, powder or bonded carbon) is determined as the point at which a known volume of the solvent completely saturates a known weight of the carbon to incipient wetness (the beginning of a slurry of insoluble carbon).

The antioxidant should be sufficiently soluble in the incipient wetness volume and provide a clear, nonturbid solution. For a single impregnation of z% loading, x grams of antioxidant are dissolved in the incident wetness volume of solvent. Thus,

| x/y = z/100 | where, x = amount of antioxidant to be loaded, |
|---|---|
| | y = grams of carbon, and |
| | z = % loading. |

For example, if 100 g of granular carbon has an incipient wetness with 100 g of water, and citric acid has a solubility in water exceeding 5% in water, then a 5 wt/wt % solution is easily prepared in water. The prepared solution is then dispensed in portions in a pipette to an agitated vessel preferably containing 100 g of granular activated carbon (for example, of the type APA or CPG available from Calgon Carbon Corporation). After completed portionwise addition of the antioxidant solution, incipient wetness is evident. The aqueous slurry of insoluble granular activated carbon is dried overnight at 105° C. in an oven. The resultant dry granular carbon product is suitable for use in the present invention for continuous filtration of frying oil.

If the chosen antioxidant is of less solubility in the chosen solvent necessary for a single impregnation, but solubility can be achieved in double the incipient wetness volume, the solution is prepared in the double volume.

If solubility is then achieved, double impregnation may be conducted (i.e., the carbon is impregnated to incipient wetness with one-half of the prepared solution, dried at 105° for 1 hr., then re-impregnated with the remaining solution and re-dried for use in continuous filtration of frying oil).

In Examples 1 and 2, corn and soybean frying oil is subjected to 2% wt/wt dosages of 5% propyl gallate impregnated granular activated carbon of CPG type AC prepared by the incipient wetness method. This equates to a 1000 ppm treatment of propyl gallate to the oil as follows:

4 cups oil equals approximately 880 g.
2 wt % of AC equals 17.6 g AC.
5 wt % of 17.6 g=0.88 g or 880 mg propyl gallate impregnated on that portion of AC placed in a cartridge.
1 ppm=1 mg/1000 g therefore 880 mg/880 g oil equals 1000 ppm of propyl gallate exposed to the fryer of oil for the duration of a weekly study.

In Situ Method of Preparing Antioxidant Impregnated Activated Carbons

Generally, commercial frying oils are supplied with one or a myriad of food grade antioxidants. In the present studies, both the corn oil and soybean oil, obtained from commercial frying establishments, contained 0.01% TBHQ as added by the oil producer.

An alternate method for preparing antioxidant impregnated carbons is to add the antioxidant to the fryer oil during continuous filtration through an AC such as AC2. Physisorption of the antioxidant will be effected in situ as is experienced in normal AC treatments of edible oils during refining stages. For example, commercially used Tenox BHA or BHT may be added to a hot frying oil to effectively prepare an antioxidant impregnated carbon suitable for continuous filtration of frying oil operations.

Thus, in Example 3 and 4 with AC2, it is believed from literature precedent that physisorption of TBHQ occurs quickly during continuous filtration to afford an antioxidant impregnated AC as follows:

0.01 g TBHQ in 100 g oil equals
0.1 g TBHQ in 1000 g oil.
880 g of oil would contain 0.088 g TBHQ
1 ppm = 1 mg / 1000 g, therefore
88 mg/ 880 g oil equals 100 ppm of TBHQ exposed to the fryer of oil for the duration of the weekly study.

The present results may indicate that adsorption of TBHQ antioxidant from the oil by APA or impregnated propyl gallate antioxidant on CPG carbon provides an environment for the antioxidant that protects it from distillation out of the media or continual decomposition while still conferring an antioxidative property to the oil. Although removal of antioxidants by carbon in a once through treatment (as often occurs in current practice) may be detrimental, continual exposure of oil to an antioxidant impregnated carbons appears to be very beneficial. Preferably, at least 20% by volume of the oil content of a fryer is filtered each minute.

Antioxidants (and preservatives) appropriate for impregnation upon carbon include but are not limited to those antioxidants found in fruits, vegetables, nuts, seeds, leaves, flowers and bark including but not limited to: amino acids such as histidine and valine, oat bran sterols, ethoxyquin, tyrosol or hydroxytyrosol, rutin, morin, myricetin, kaempferol, tannic acid, ellagic acid, musizin, citric acid, L-ascorbic acid, quercetin, boldine, peanut hull antioxidant, alpha-tocopherols, EDTA, dilauryl thiodipropionate ("DLTBP"), nor dihydroguaiaretic acid ("NDGA"), guaiac gum, thiodipropionic acid, lecithin, cardanol, cardol, anacardicacid, oryzanol, cashew nutshell oil, propyl gallate and gallic esters and other phenols from spices and herbs (including but not limited to rosemary, clove, sage, nutmeg, allspice, cinnamon, ginger, pepper, mace, paprika (TBHQ), citrus oil, trihydroxy butyrophenol ("THBP"), BHT and BHA) and combinations thereof. Esters and salts of the following acids are also suitable: sodium erythorbic acid, citric acid, L-ascorbic acid, ascorbyl palmitate, EDTA and DTLBP. Either the naturally occurring antioxidant or a synthetic equivalent thereof can be used.

Antioxidants impregnated on carbon by physisorption, at dosages in the range of 0.1 to 20 wt/wt %, provide a protected antioxidant environment and/or time-released antioxidant concentration as needed to protect frying oil. Preferably the dosage of antioxidant is in the range of 0.1 to 5 wt/wt %. Antioxidant impregnated carbons may alleviate the current deficiencies of antioxidants by preventing them from steam distilling out of the oil or being used up through food absorption. The immobilized form of strongly physisorbed food grade antioxidants should relieve the user of adding more antioxidants such as Tenox. Alternatively, as provided in the present invention the operator may choose to prepare an antioxidant impregnated carbon in situ.

Assessment of Polymer Reduction With Other Adsorbents

An immersion treatment study was conducted with each of powdered Magnesol XL ® (Dallas Group of America), Frypowder (Miroil), Silasorb (Manville), Alumina (neutral, Alcoa), powdered AC2 and a nontreated control corn oil in open beakers, heated by silicon oil in a Frydaddy at 190°-200° C. The studies were conducted without food frying. Surface to volume ratio of the oil was approximately that of the Frydaddy continuous treatment studies. Results of these studies are given in FIG. 10.

Figure 9:
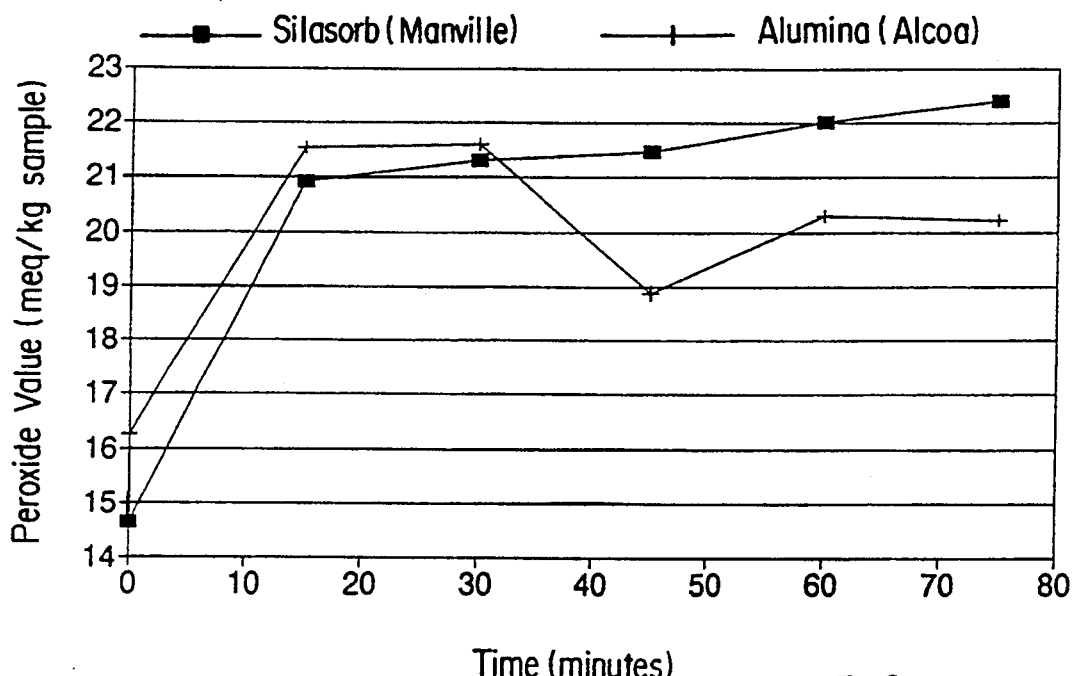
FIG. 9 is a graphical illustration of the increase in peroxide value experienced upon treatment by silica and alumina.
Figure 10:
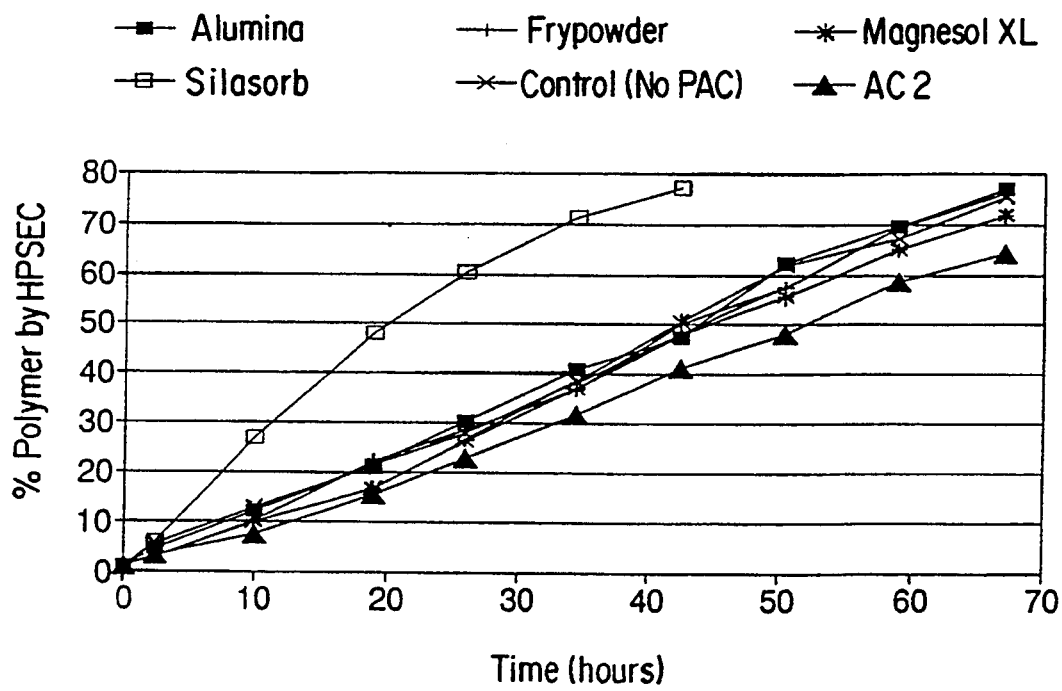
FIG. 10 is a graphical representation of an HPSEC study of immersion treatments of corn oil with various non-carbon and carbon adsorbents.

These studies simulate the industry practice of the use of silicates which are employed to remain in the fryer. Neither alumina nor silica is effective in reducing peroxide value as shown in FIG. 9. Analysis for polymer formation was accomplished by size exclusion chromatography of the oil aliquots over time. As shown in FIG. 10, constant exposure of the hot oil to Silasorb (calcium silicate) linearly formed 30% more polymer, imparted a very dark color to the oil and was removed from the study at 42h.

Figure 11:
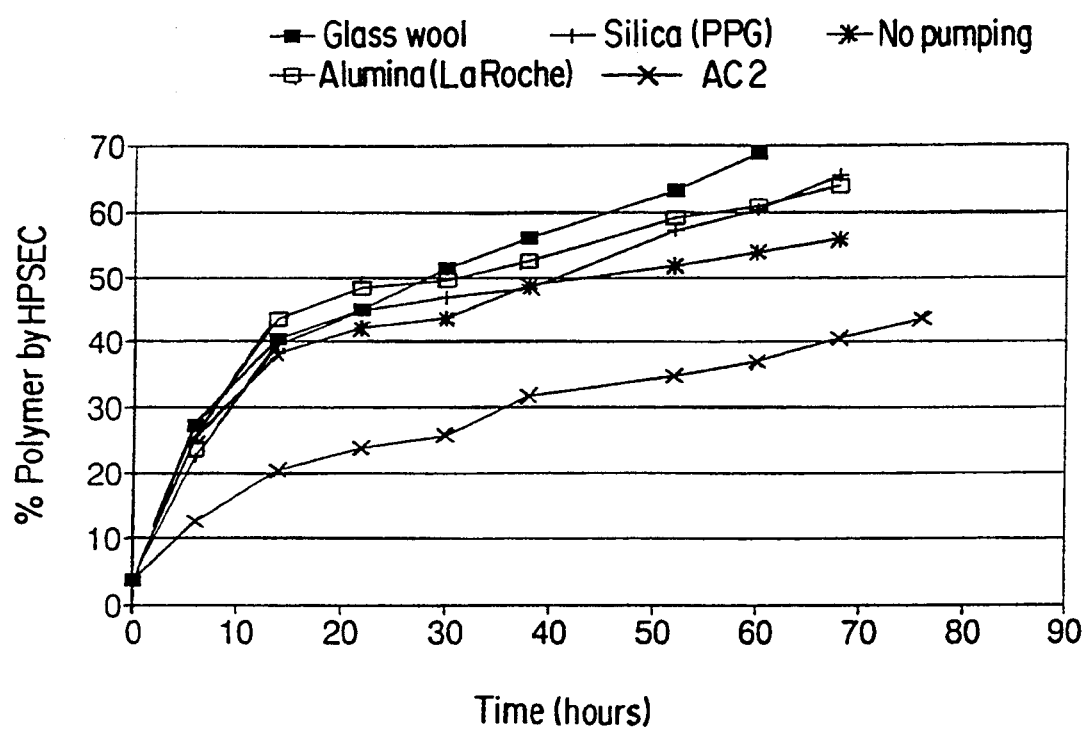
FIG. 11 is a graphical representation of an HPSEC study of continuous filtering treatment of soybean oil with granular alumina and spherical silica as compared to AC2.

Polymer reduction by Magnesol XL (magnesium silicate) was only slightly better than the control whereas powdered carbon AC2 exhibited less polymer formation as illustrated in FIG. 11. The odor and color of the AC2 treated oil was desirable. The results of this study at 70 h of treatment are given in Table 4.

TABLE 4

| | |
|---|---|
| AC2 (powder) | 58.7 |
| Alumina | 69.6 |
| Frypowder | 69.3 |
| Magnesol XL | 65.0 |
| Silasorb | >>77 |
| Control | 67.3 |

It is thus clear that carbon has performance advantages over other adsorbents in this type of exposure. The study confirmed that silicates are not useful for polymer reduction.

These immersion studies demonstrate that activated carbon is effective in improving oil quality and lifetime when immersed in the oil during elevated temperature operations. Preferably the activated carbon is encompassed within an oil porous enclosure during immersion. Such an enclosure preferably allows oil to flow through and contact the activated carbon but does not allow the activated carbon to leave the enclosure and enter the bulk oil. The enclosure is immersed in the oil during elevated temperature operations.

To further demonstrate the effectiveness of AC in this invention, a granular activated alumina (A2, LaRoche Chemical) and spherical silica (HiSil-210, Pittsburgh Plate and Glass, Co.) was employed at 2% wt/wt dosage continuous filtration treatment study in raw potato fried soybean oil. A dramatic performance margin by AC2 is illustrated in FIG. 12 as compared to silica, alumina and an ultrapure glass wool treated control. Other silicas as silicates could not be employed since granular forms were not available. Powders effect significant pressure drop under continuous filtration processes of this invention.

Although the invention has been described in detail for purposes of illustration, it is to be understood that such detail is solely for that purpose and that variations can be made therein by those skilled in the art without departing from the spirit and scope of the invention except as it may be limited by the claims.

What is claimed is:

1. An edible oil adsorbent comprising an activated carbon, effective for extending the life of the edible oil during substantially continuous use in a process at a temperature of at least 120° C. said adsorbent comprising an activated carbon impregnated with at least one food grade antioxidant selected from the group of amino acids consisting of histidine and valine.

2. An edible oil adsorbent effective for extending the life of the edible oil during substantially continuous use in a process at a temperature of at least 120° C., said adsorbent comprising an activated carbon impregnated with at least one food grade anti-oxidant selected from the group of phenols consisting of TBHQ, phenols from spices, resmanol, carnosol, carnosic acid, phenols from herbs, musizin, ethoxyquin, propyl gallate, tyrosol or hydroxytyrosol, rutin, kaempferol, tannic acid, ellagic acid, quercetin, peanut hull antioxidant, alpha-tocopherols, gallic esters, BHT, BHA, trihydroxybutyrophenol ("THBP"), nor dihydroguaiartic acid ("NDGA"), guaiac gum, cardanol, cardol, anacardicacid, oryzanol, clove oil, cashew nutshell oil, boldine, morin and myricetin.

3. An edible oil adsorbent effective for extending the life of the edible oil during substantially continuous use in a process at a temperature of at least 120° C., said adsorbent comprising an activated carbon impregnated with at least one food grade anti-oxidant selected from the group of sterols consisting of oat bran, boldine and kaempferol.

4. An edible oil adsorbent effective for extending the life of the edible oil during substantially continuous use in a process at a temperature of at least 120° C., said adsorbent comprising an activated carbon impregnated with at least one food grade anti-oxidant selected from the group of esters consisting of esters from spices, esters from herbs, ascorbyl palmitate, gallic esters, L-ascorbic acid, sodium erythorbic acid and dilauryl thiodipropionate ("DLTBP").

5. An edible oil adsorbent effective for extending the life of the edible oil during substantially continuous use in a process at a temperature of at least 120° C., said adsorbent comprising an activated carbon impregnated with at least one food grade anti-oxidant comprising an emulsifier, where the emulsifier is lecithin.

6. An edible oil adsorbent effective for extending the life of the edible oil during substantially continuous use in a process at a temperature of at least 120° C., said adsorbent comprising an activated carbon impregnated with at least one food grade anti-oxidant comprising a sulphur-containing acid, where the sulphur-containing acid is thiodiproprionic acid.

7. An edible oil adsorbent effective for extending the life of the edible oil during substantially continuous use in a process at a temperature of at least 120° C., said adsorbent comprising an activated carbon impregnated with at least one food grade anti-oxidant comprising a tricarboxylic acid, where the tricarboxylic acid is citric acid.

8. An edible oil adsorbent effective for extending the life of the edible oil during substantially continuous use in a process at a temperature of at least 120° C., said adsorbent comprising an activated carbon impregnated with at least one food grade, non-chelating anti-oxidant selected from the group of amino acids, phenols, sterols, esters, emulsifiers, sulphur-containing acids and dicarboxylic or tricarboxylic acids.

9. The edible oil adsorbent according to claim 1, 2, 3, 4, 5, 6, 7 or 8 wherein said antioxidant is impregnated upon said activated carbon by in situ physisorption.

10. An article of manufacture, said article of manufacture comprising:
   A container having at least one inlet and one outlet capable for substantially continuous use in edible oil at a temperature of at least 120° C.; and
   Activated carbon impregnated with at least one food grade antioxidant; said activated carbon located within said enclosure.

11. The article of manufacture according to claim 10 wherein said activated carbon is selected from the group consisting of granular activated carbons, pelletized activated carbons and bonded activated carbons.

12. The article of manufacture according to claim 10 wherein said activated carbon is a powdered activated carbon.

13. The article of manufacture according to claim 10 wherein said at least one food grade anti-oxidant is a non-chelating antioxidant selected from the group of amino acids, phenols, sterols, esters, emulsifiers, sulphur-containing acids and dicarboxylic or tricarboxylic acids.

14. The article of manufacture according to claim 13 wherein said amino acids are selected from the group consisting of histidine and valine.

15. The article of manufacture according to claim 13 wherein said phenols are selected from the group consisting of TBHQ, phenols from spices, resmanol, carnosol, carnosic acid, phenols from herbs, musizin, ethoxyquin, propyl gallate, tyrosol or hydroxytyrosol, rutin, kaempferol, tannic acid, ellagic acid, quercetin, peanut hull antioxidant, alpha-tocopherols, gallic esters, BHT, BHA, trihydroxybutyrophenol ("THBP"), nor dihydroquaiartic acid ("NDGA"), guaiac gum, cardanol, cardol, anacardicacid, oryzanol, clove oil, cashew nutshell oil, boldine, morin and myricetin.

16. The article of manufacture according to claim 13 wherein said sterols are selected from the group consisting of oat bran, boldine and kaempferol.

17. The article of manufacture according to claim 13 wherein said emulsifier comprises lecithin.

18. The article of manufacture according to claim 13 wherein said sulphur-containing acid comprises thiodiproprionic acid.

19. The article of manufacture according to claim 13 wherein said tricarboxylic acid comprises citric acid.

20. The article of manufacture according to claim 10 wherein said esters are selected from the group of esters consisting of esters from spices, esters from herbs, ascorbyl palmitate, gallic esters, L-ascorbic acid and dilauryl thiodipropionate ("DLTBP").

21. The article of manufacture according to claim 10 wherein said antioxidant is impregnated upon said activated carbon by in situ physisorption.

22. The article of manufacture according to claim 10, wherein said container is an oil-immersible packet.

23. The article of manufacture according to claim 10, wherein said container is a replaceable cartridge.

* * * * *